Figure 1:
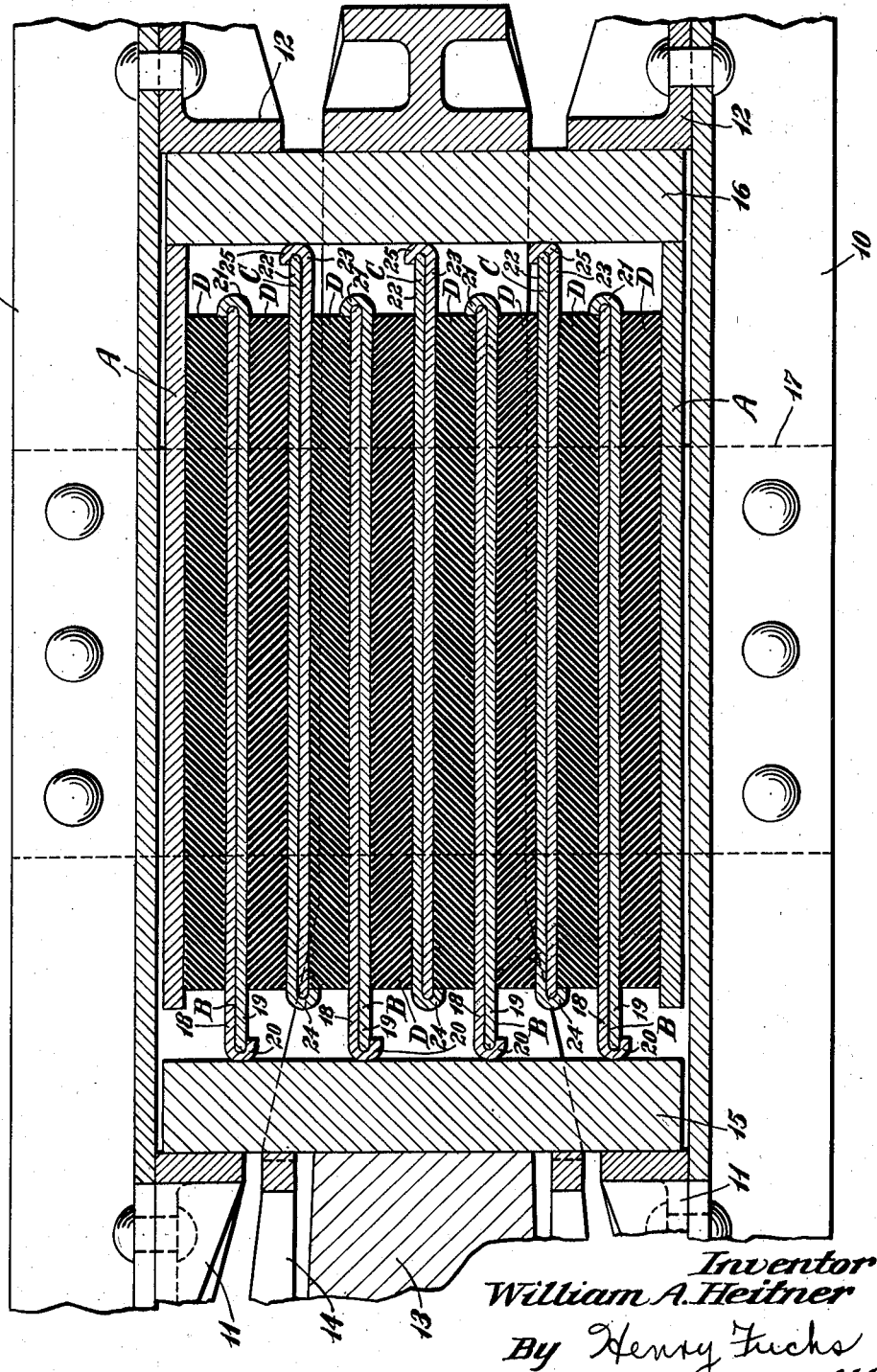

July 11, 1939.    W. A. HEITNER    2,165,375
SHOCK ABSORBING MECHANISM
Filed May 7, 1938    2 Sheets-Sheet 1

Inventor
William A. Heitner
By Henry Fuchs
Atty.

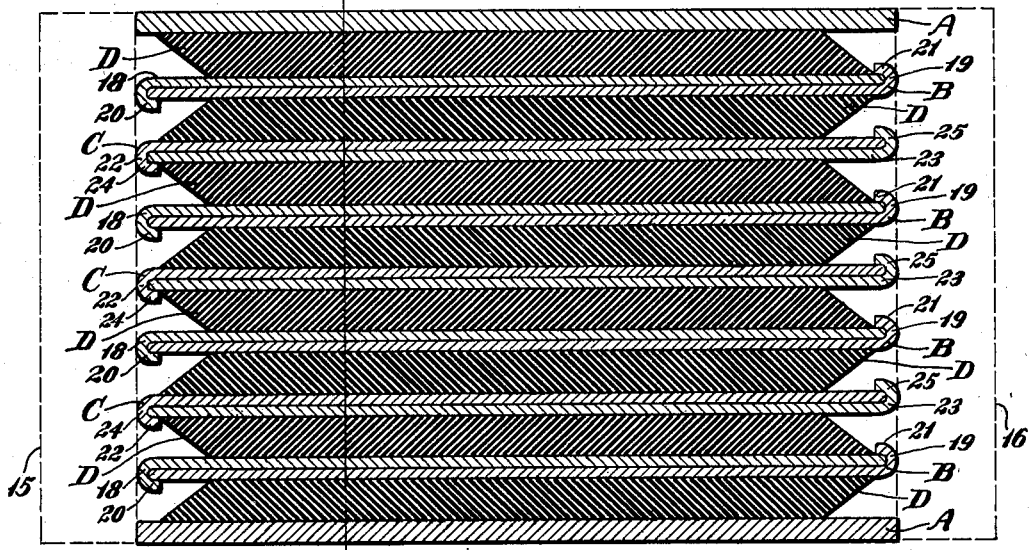
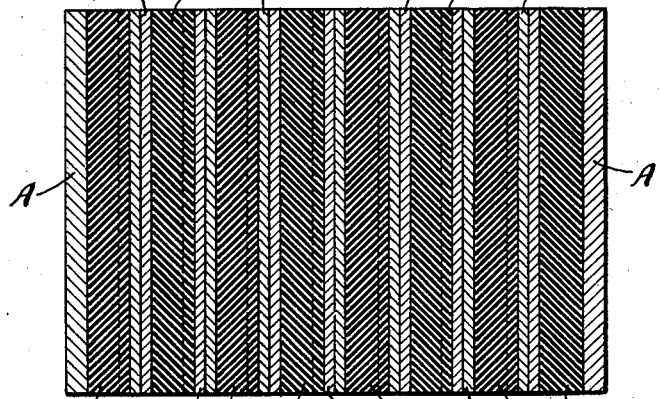

Patented July 11, 1939

2,165,375

UNITED STATES PATENT OFFICE 2,165,375

SHOCK ABSORBING MECHANISM

William A. Heitner, Chicago, Ill., assignor to W. H. Miner, Inc., Chicago, Ill., a corporation of Delaware Application May 7, 1938, Serial No. 206,626

4 Claims. (Cl. 213—44)

This invention relates to improvements in shock absorbing mechanisms.

One object of the invention is to provide a shock absorbing mechanism adapted to be compressed between follower acting elements which are movable toward and away from each other, comprising relatively movable, longitudinally disposed members actuated by said follower elements and connected to interposed rubber means, the rubber element of which is distorted by relative movement of said longitudinally disposed members to place said rubber element under shear and thereby cushion shocks.

Another object of the invention is to provide a shock absorbing mechanism especially adapted for railway draft riggings, comprising a plurality of longitudinally disposed, relatively movable, metal plates having rubber pads interposed between and secured to the same, whereby upon compression of the mechanism between the usual relatively movable followers of the draft rigging stretching action is applied to opposite sides of each rubber pad in reverse directions to distort said pad, and thereby cushion shocks imparted to the mechanism.

A more specific object of the invention is to provide an efficient shock absorbing mechanism comprising a plurality of longitudinally disposed plates interposed between front and rear follower elements which are movable toward and away from each other, the front and rear ends of adjacent plates being staggered to provide for relative longitudinal movement thereof by said followers when the latter are moved with respect to each other, and longitudinally disposed rubber pads interposed between and fixed to said plates, whereby said pads are distorted to cushion shocks upon relative longitudinal movement of said plates.

Other objects of the invention will more clearly appear from the description and claims hereinafter following.

In the drawings forming a part of this specification, Figure 1 is a horizontal, longitudinal, sectional view through a portion of the underframe structure at one end of a railway car, illustrating my improved shock absorbing mechanism in connection therewith. Figure 2 is a horizontal, longitudinal, sectional view of the improved shock absorbing mechanism shown in Figure 1 in compressed condition between the front and rear followers of the railway draft rigging, the followers being indicated in dotted lines. Figure 3 is a transverse, vertical, sectional view, corresponding substantially to the line 3—3 of Figure 2. Figure 4 is a horizontal, longitudinal, sectional view of one of the rubber pads and the associated plates of the improved mechanism illustrated in Figure 1.

In said drawings, 10—10 indicate the longitudinally extending center or draft sills of a railway car underframe structure having the usual top and bottom flanges, the flanges at the bottom of the sills only being shown in Figure 1. On the inner sides, the sills are provided with front and rear stop lugs 11—11 and 12—12 commonly employed in draft riggings. The rear portion of the usual coupler shank is indicated by 13, to which is operatively connected a yoke 14 of well-known construction. My improved shock absorbing mechanism and cooperating front and rear main followers 15 and 16 are disposed within the yoke, the followers 15 and 16 cooperating respectively with the front and rear stop lugs 11—11 and 12—12 in the usual manner. A saddle plate 17 secured to the bottom flanges of the sills 10—10 underlies the yoke 14 and supports the latter and the parts contained therein.

My improved shock absorbing mechanism comprises broadly a pair of relatively heavy plate members A—A; a set of longitudinally disposed members B—B; a second set of longitudinally disposed members C—C alternated with the members B—B; and a plurality of longitudinally disposed platelike rubber pads D—D alternated with the members B and C, the members B and C and the pads D being embraced between the heavy plate members A—A.

The heavy plates A—A are of substantially rectangular outline and disposed at opposite sides of the mechanism adjacent the sills. These plates normally have their rear ends bearing on the follower 16 and their front ends spaced from the follower 15.

Each longitudinally disposed member B is preferably composed of a pair of substantially rectangular metal plates 18 and 19 in flat surface contact with each other, the front end of the plate 18 being curled over, as indicated at 20, and in hooked engagement with the front end edge of the plate 19. The rear end of the plate 19 is curled over, as indicated at 21, and is hooked over at the rear end edge of the plate 18. As will be evident, the opposite ends of each member B thus present rounded faces adapted to cooperate with the followers 15 and 16, thereby preventing scoring of the followers by the raw edges of the plates. As shown in Figure 1, the front ends of the members B normally bear on the front follower 15 and the rear ends are normally spaced from the rear follower 16.

Each longitudinally disposed member C is also preferably composed of a pair of substantially rectangular metal plates 22 and 23 which are in flat surface engagement with each other. The front end of the plate 22 is curled over, as indicated at 24, and the rear end of the plate 23 is curled over, as indicated at 25, said curled ends being engaged over the front and rear end edges of the plates 22 and 23, respectively, thereby providing a unit similar to the member B. As shown in Figure 1, the rear ends of the members C—C normally bear on the follower 16 and the front ends of these members are normally spaced from the front follower 15.

The rubber pads D are in the form of rectangular blocks or relatively thick plates which are shorter than the plates A and the members B and C. The mechanism as shown comprises eight rubber pads D—D, four members B—B, three members C—C—C, and two plates A—A. Two of the pads D—D are disposed at opposite sides of the mechanism and are secured to the inner sides of the plates A—A, the outer surface of each pad D being vulcanized to the inner surface of the corresponding plate A. The other side of each of these two pads is secured to the adjacent plate of the outer member B at the corresponding side of the mechanism, the inner surface of the pad D seen at the top of Figure 1 being vulcanized to the surface of the plate 18 of the adjacent member B and the inner surface of the pad D seen at the bottom of Figure 1 being vulcanized to the surface of the plate 19 of the adjacent member B. The remaining six pads D—D, which are alternated with the members B and C, are secured respectively to these members, each of these pads having the surface on one side thereof vulcanized to the outer surface of the adjacent plate of the corresponding member B and the surface on the other side thereof vulcanized to the outer surface of the adjacent plate of the corresponding member C. Each of these six pads D, together with the two plates to which it is secured, thus forms a unit. These six units, each comprising a pad D and two plates, are of similar design except that the adjacent units of the assembled gear have the ends of the plates arranged so as to be spaced differently longitudinally of the pads. One of three of such units is shown in Figure 4. The three units corresponding to that shown in Figure 4 are alternated with the remaining three of said group of six units. Each unit corresponding to Figure 4 has the rubber pad D thereof vulcanized to the plates 18 and 23 of the adjacent members B and C. Each of the remaining three units has the rubber pad D thereof vulcanized to the plates 19 and 22 of the adjacent members B and C. Each unit, comprising the pad D and the plates 18 and 23, has the curled ends of these plates projecting greater distances beyond the front and rear ends of the pad than the straight edged other ends of said plates, as clearly shown in Figures 1 and 4, and each unit comprising the pad D and the plates 19 and 22 has the straight edged ends of these plates projecting greater distances beyond the front and rear ends of the pad than the curled ends of said plates, as clearly shown in Figure 1.

In assembling the mechanism, the six units, each comprising a pad D and two plates are placed side by side, the units comprising the pads D and plates 19 and 22 being alternated with the units comprising the pads D and plates 18 and 23, the hooked ends 20 of the plates 18 being engaged over the straight edged ends of the adjacent plates 19 and the hooked ends 21 of the plates 19 being engaged over the straight edged ends of the adjacent plates 18 to form the members B—B, and the hooked ends 24 of the plates 23 being engaged over the straight edged ends of the adjacent plates 22 and the hooked ends 25 of the plates 23 being engaged over the straight edged ends of the adjacent plates 22 to form the members C—C. In the assembling operation, the heavy plates A—A, together with the attached pads D—D and plates 18 and 19 are also placed at opposite sides of the six units referred to, with the plates 18 and 19 in flat surface contact and hooked engagement with the plates 19 and 18, respectively, of the outermost of said six units. The assembled mechanism is then placed between the front and rear followers 15 and 16 of the draft rigging, as shown in Figure 1.

Although the members B and C have herein been shown and described as each composed of two plates, it will be evident that it is within the scope of the invention to form each member B and C of a single plate with the pads D—D vulcanized to opposite sides thereof.

The operation of my improved mechanism is as follows: Assuming a buffing or pushing force is applied to the coupler 13, thereby moving the same inwardly, the front follower 15 will be forced rearwardly toward the follower 16 which, at this time, is held stationary by the stop lugs 12—12, thereby moving the members B—B rearwardly while the plates A—A and the members C—C are held stationary by engagement with the stationary rear follower. Each rubber pad will thus be stretched in opposite directions at opposite sides thereof through relative movement of the attached plates of the members B and C and relative movement of the plates A—A with respect to the outer members B—B, thus distorting the pads, as shown in Figure 2, and, in effect, placing the same under shear. The shock imparted to the mechanism will thus be cushioned due to the inherent resiliency of the rubber pads.

When the actuating force is reduced, the tendency of the distorted rubber pads to return to their normal shape will return the members B and C and the plates A to which they are secured to the normal full release position shown in Figure 1, thereby also effecting return of the followers and other parts of the draft rigging.

The operation in draft is the same as in buff with the exception that the front follower 15 is held stationary and the rear follower 16 is pulled forwardly by the yoke 14, moving the members C—C and the plates A—A forwardly while the members B—B are held stationary by the front follower 15.

In the normal full release position of the mechanism, the front ends of the plates A—A and the front ends of the members C—C are spaced a distance from the front follower 15 corresponding to the spacing of the rear ends of the members B—B from the rear follower 16. Due to this equal spacing, the front and rear ends of the plates A—A and all of the members B and C will be simultaneously engaged by the front and rear followers when the mechanism is fully compressed, these plates and members thus acting as a solid column to transmit the force from one main follower to the other and limit compression of the mechanism, thereby relieving the rubber pads from undue or excessive shearing strain.

Although my improved shock absorbing mechanism has been herein shown and described as applied to a railway draft rigging, it will be evident that it is not limited to such use and may be employed wherever it is found necessary to cushion shocks, as for example in connection with railway car trucks, etc.

I have herein shown and described what I now consider the preferred manner of carrying out my invention, but the same is merely illustrative and I contemplate all changes and modifications that come within the scope of the claims appended hereto.

I claim:

1. A cushioning mechanism composed of a plurality of elongated units arranged side by side, each unit comprising an elongated rubber pad, and elongated plates secured to opposite sides of said pad, said plates being disposed lengthwise of said pad, each of said plates having one end thereof projecting outwardly beyond the pad and beyond the corresponding end of the other plate.

2. A cushioning mechanism composed of a plurality of units arranged side by side, each unit comprising an elongated rubber pad, and a pair of elongated plates secured to opposite side faces and extending lengthwise of said pad, the front and rear ends of each plate projecting beyond the corresponding ends of said pad, the front end of one of said plates projecting to a greater extent than the rear end thereof, and the rear end of the other end projecting to a greater extent than the front end thereof, adjacent units of said mechanism being arranged with plates having similarly projecting ends in flat contact with each other.

3. In a shock absorbing mechanism, the combination with a set of elongated pressure transmitting members arranged lengthwise of the mechanism; of a second set of elongated pressure transmitting members arranged lengthwise of the mechanism, the members of one set being alternated with the members of the other set, the ends of the members of said first named set, at one end of the mechanism, projecting beyond the corresponding ends of the members of the second named set, and the ends of the members of the second named set, at the other end of the mechanism, projecting beyond the corresponding ends of the members of the first named set, each member of each of said sets comprising a pair of elongated plates, disposed side by side in face to face contact with each other; and a plurality of elongated rubber pads interposed respectively between adjacent members of said two sets and having their opposite ends spaced inwardly respectively from said projecting ends of the first and second named sets of members, each of said pads being fixed to the adjacent plates of the members between which said pad is disposed.

4. In a shock absorbing mechanism, the combination with a set of elongated pressure transmitting members disposed lengthwise of the mechanism; of a second set of elongated pressure transmitting members disposed lengthwise of the mechanism, the members of one set being alternated with the members of the other set; and a plurality of elongated rubber pads, one of said pads being interposed between each two adjacent members, the members of said first named set, at one end of the mechanism, projecting beyond the corresponding ends of the members of the second named set and beyond the corresponding ends of the rubber pads to receive the actuating force, and the members of said second named set, at the other end of the mechanism, projecting beyond the corresponding ends of the members of the first named set, and the corresponding ends of said rubber pads, to receive the actuating forces, each member of each set comprising a pair of elongated plates, disposed side by side in face to face contact with each other, said plates of each pair having, at each end of the mechanism, one end of one curled over and in hooked engagement with the corresponding end of the other plate, each pad having its opposite side faces secured to the adjacent plates of the members between which said pad is disposed.

WILLIAM A. HEITNER.